United States Patent
Deneszczuk et al.

(10) Patent No.: US 11,982,302 B1
(45) Date of Patent: May 14, 2024

(54) SNAP RINGS, ASSEMBLIES, AND METHODS FOR RETAINING COMPONENTS ON A SHAFT

(71) Applicant: GM GLOBAL TECHNOLOGY OPERATIONS LLC, Detroit, MI (US)

(72) Inventors: Gregory William Deneszczuk, Royal Oak, MI (US); Vishvjit Vitthal Kurade, Kurade (IN); Nagesh Maruti Kaudgaonkar, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/320,543

(22) Filed: May 19, 2023

(51) Int. Cl.
*F16B 2/20* (2006.01)

(52) U.S. Cl.
CPC ..................... *F16B 2/20* (2013.01)

(58) Field of Classification Search
CPC ............ B24B 37/32; F16B 2/20–2/248; F16B 21/18–21/186; F16J 15/0893
See application file for complete search history.

(56) References Cited

U.S. PATENT DOCUMENTS

| | | | | |
|---|---|---|---|---|
| 3,325,892 A | * | 6/1967 | Delgodo | F16J 15/0893 228/151 |
| 4,974,821 A | * | 12/1990 | Balsells | F16F 1/045 267/167 |
| 5,161,806 A | * | 11/1992 | Balsells | F16J 15/121 277/467 |
| 5,354,072 A | * | 10/1994 | Nicholson | F16J 15/0887 277/647 |
| 5,474,309 A | * | 12/1995 | Balsells | H05K 9/0016 267/167 |
| 6,273,477 B1 | * | 8/2001 | Ohmi | F16L 19/0212 277/541 |
| 6,502,833 B1 | * | 1/2003 | Shibata | F16J 15/0887 277/924 |
| 6,843,276 B2 | * | 1/2005 | Tadokoro | F16L 3/26 138/121 |
| 6,860,485 B2 | * | 3/2005 | Masuyama | F16J 9/063 277/467 |

(Continued)

OTHER PUBLICATIONS

Cable Ties and More, https://web.archive.org/web/20200625164756/ https://www.cabletiesandmore.com/black-wire-loom-tubing Retrieved Feb. 23, 2024 (Year: 2020).*

(Continued)

*Primary Examiner* — Jacob J Cigna
(74) *Attorney, Agent, or Firm* — Lorenz & Kopf, LLP (57) ABSTRACT

Snap rings, assemblies, and methods are provided for retaining a component on a shaft. The snap ring includes an annular body defining an opening through a center thereof, defining an outer curved surface and an inner curved surface, having a first end and a second end spaced apart from each other to define a gap therebetween, and having a first circumferential edge and a second circumferential edge spaced apart from each other to define a circumferential opening slit extending from the first end to the second end. The snap ring is configured to be received within a continuous, circumferential mating groove formed in an exterior surface of the shaft, and to retain the component in a fixed position when the component is located on the shaft and the snap ring is located in the mating groove.

17 Claims, 11 Drawing Sheets

(56) References Cited

U.S. PATENT DOCUMENTS

| | | | | |
|---|---|---|---|---|
| 7,866,040 | B2* | 1/2011 | Swensen | F16J 15/061 |
| | | | | 29/888.3 |
| 9,909,636 | B2* | 3/2018 | Kompa | H01R 13/187 |
| 9,969,069 | B2* | 5/2018 | Pergantis | B25B 27/023 |
| 10,711,932 | B2* | 7/2020 | Sánchez | F02M 35/10157 |
| 11,480,250 | B2* | 10/2022 | Balsells | F16J 15/3236 |
| 11,754,185 | B1* | 9/2023 | Whitlow | F16J 15/0893 |
| | | | | 277/500 |
| 2002/0122690 | A1* | 9/2002 | Poon | F16B 21/18 |
| | | | | 403/326 |
| 2004/0119245 | A1* | 6/2004 | Thomas | F16J 15/3452 |
| | | | | 277/554 |
| 2022/0243816 | A1* | 8/2022 | Langtry | F16J 15/0893 |

OTHER PUBLICATIONS

1 Piece Fashion C Shape Stainless Steel Inlay Zircon Bangle, Internet Image Search, https://www.navichic.com/products/1-piece-fashion-c-shape-stainless-steel-inlay-zircon-bangle Retrieved Feb. 23, 2024 (Year: 2024).*

* cited by examiner

SNAP RINGS, ASSEMBLIES, AND METHODS FOR RETAINING COMPONENTS ON A SHAFT

INTRODUCTION

The technical field generally relates to snap rings, and more particularly relates to a snap ring that is capable of functioning as a physical barrier and a biasing member to retain a component in a fixed position on a shaft.

Various mechanical systems within vehicles, such as certain clutches and electric motors, include retainer rings or snap rings that are used to maintain positions of other components (referred to herein as a retained components) within the systems. A snap ring is typically a substantially circular or annular retaining device having a break or opening which divides the ring into two interconnected curvilinear members. The members may be deflected or flexed to facilitate insertion into a mating groove. While within the mating groove, the snap rings function as a physical barrier against movement of the retained component(s) relative to the inner walls of the mating groove. For example, a retained component may be coupled to a rotatable shaft by locating an end of the shaft through a central bore of the retained component and sliding the gear longitudinally along the shaft until a first side of the retained component contacts a first barrier, such as a wall protruding from the shaft or another component coupled to the shaft (e.g., a gear). A snap ring may then be inserted into a mating groove recessed in the shaft adjacent to a second side of the retained component such that the snap ring is partially located within the mating groove and partially protruding from the mating groove. With this arrangement, the retained component is retained in a fixed longitudinal position on the shaft between the first barrier and the exposed portion of the snap ring (e.g., a second barrier).

Generally, snap rings require one or more additional components configured to maintain the position of the snap ring within a mating groove and/or maintain the position of the retained component against the snap ring. For example, in some applications a snap ring is located in a mating groove adjacent to a retained component and a biasing member (e.g., a spring) is used to apply a force against the retained component to hold the retained component against the snap ring. These additional components occupy additional space and represent a potential source of failure of the assembly.

Accordingly, it is desirable to provide a snap ring that does not require additional components for maintaining positions of retained components. Furthermore, other desirable features and characteristics of the present invention will become apparent from the subsequent detailed description and the appended claims, taken in conjunction with the accompanying drawings and the foregoing technical field and background.

SUMMARY

A snap ring is provided for retaining components. The snap ring includes an annular body defining an opening through a center thereof. The annular body defines an outer curved surface and an inner curved surface. The annular body has a first end and a second end spaced apart from each other to define a gap therebetween. A first circumferential edge and a second circumferential edge spaced apart from each other to define a circumferential slit extending from the first end to the second end.

In various embodiments, the annular body is configured for elastic deformation in a radial direction thereof by decreasing a first dimension between the first end and the second end and elastic deformation in an axial direction by decreasing a second dimension between the first circumferential edge and the second circumferential edge.

In various embodiments, the snap ring is formed of a metallic material.

An assembly is provided that includes a shaft having a circular cross-sectional shape, a component having a bore configured to receive the shaft therethrough, and a snap ring having an annular body defining an opening through a center thereof. The annular body defines an outer curved surface and an inner curved surface. The annular body has a first end and a second end spaced apart from each other to define a gap therebetween. A first circumferential edge and a second circumferential edge spaced apart from each other to define a circumferential slit extending from the first end to the second end. The snap ring is configured to be received within a continuous, circumferential mating groove formed in an exterior surface of the shaft. The shaft and the snap ring, in combination, are configured to retain the component in a fixed position when the component is located on the shaft and the snap ring is located in the mating groove.

In various embodiments, the shaft and the snap ring, in combination, are configured to retain the component in the fixed position in a manner such that a first side of the component is in contact with a body fixed to the shaft and a second side of the component is in contact with the snap ring.

In various embodiments, the body fixed to the shaft is a surface integral with and protruding from the shaft.

In various embodiments, the body fixed to the shaft is another component separate from and secured to the shaft.

In various embodiments, the snap ring is configured for elastic deformation in a radial direction thereof by decreasing a first dimension between the first end and the second end and elastic deformation in an axial direction by decreasing a second dimension between the first circumferential edge and the second circumferential edge.

In various embodiments, the snap ring is configured to be apply a biasing force against the component while the snap ring is in the mating groove and the component is in the fixed position. In various embodiments, the biasing force has a force vector that is aligned with a geometric line that intersects a wall of the mating groove.

In various embodiments, the snap ring is configured to be received within the mating groove to a depth in excess of one half of an outer diameter of the snap ring.

In various embodiments, the snap ring is configured to be pinned within the mating groove between a wall of the mating groove and the component while the component is in the fixed position, wherein the first circumferential edge and the second circumferential edge are not in contact with each other while the snap ring pinned in the mating groove.

In various embodiments, the shaft, the component, and the snap ring are configured to be installed as components of a vehicle.

A method is provided for retaining a component on a shaft. The method includes locating an end of the shaft though a bore of the component such that the component is received on the shaft, sliding the component along the shaft to contact a first side of the component with a body fixed to the shaft, providing a snap ring comprising an annular body defining an opening through a center thereof, the annular body defining an outer curved surface and an inner curved surface, the annular body having a first end and a second end spaced apart from each other to define a gap therebetween, a first circumferential edge and a second circumferential edge spaced apart from each other to define a circumferential slit extending from the first end to the second end, applying a compressive force to the snap ring in an axial direction thereof to decrease a dimension between the first circumferential edge and the second circumferential edge, inserting the snap ring into a mating groove of the shaft adjacent to a second side of the component while maintaining the compressive force on the snap ring, and releasing the compressive force from the snap ring such that the dimension between the first circumferential edge and the second circumferential edge increases causing contact between the snap ring and the second side of the component while the snap ring remains within the mating groove. The snap ring is pinned within the mating groove between a wall of the mating groove and the second side of the component, wherein the snap ring applies a biasing force against the second side of the component.

In various embodiments, the body fixed to the shaft is a surface integral with and protruding from the shaft.

In various embodiments, the body fixed to the shaft is another component separate from and secured to the shaft.

In various embodiments, inserting the snap ring into the mating groove includes locating the snap ring within the mating groove to a depth in excess of one half of an outer diameter of the snap ring.

In various embodiments, the biasing force has a force vector that is aligned with a geometric line that intersects the wall of the mating groove.

In various embodiments, the first circumferential edge and the second circumferential edge are not in contact with each other while the snap ring pinned in the mating groove.

In various embodiments, the method includes installing the shaft, the component, and the snap ring in a vehicle as components thereof.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
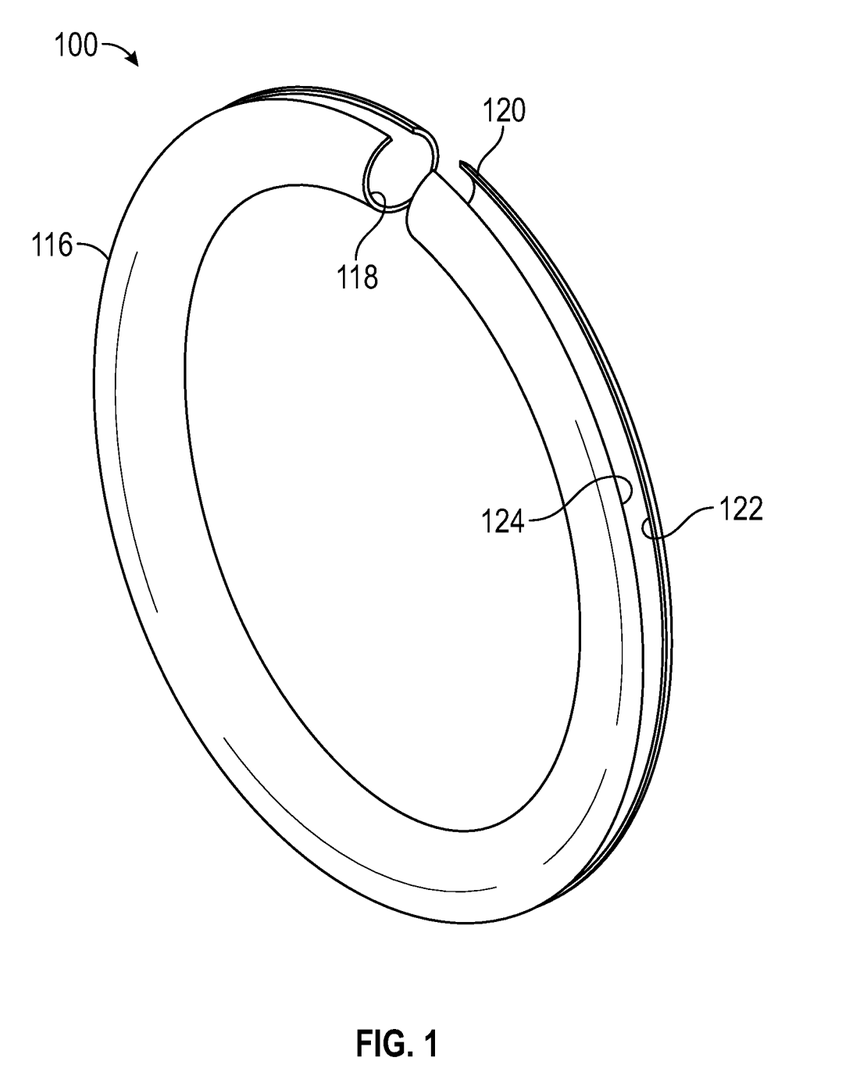
FIG. 1 schematically represents a perspective view of a snap ring in accordance with an embodiment.
Figure 2:
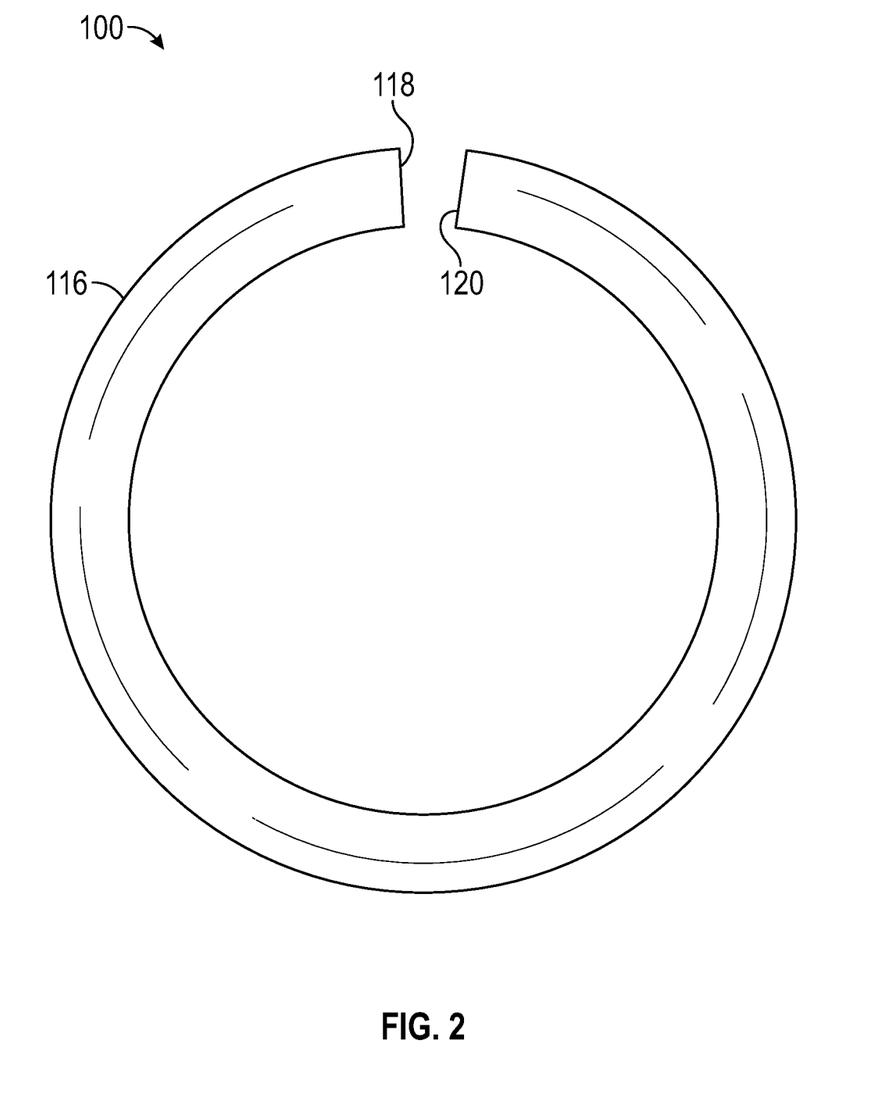
FIG. 2 schematically represents a side view of the snap ring of FIG. 1.

FIGS. 1 and 2 schematically represent perspective and side views of a retaining ring or snap ring 100 in accordance with certain nonlimiting aspects of an embodiment. The snap ring 100 includes a substantially circular or annular body 116 having an opening through a center thereof. The annular body 116 defines an outer curved surface and an inner curved surface. The annular body 116 has a first end 118 and a second end 120 spaced apart from each other to define a gap therebetween. The gap effectively divides the annular body 116 into two interconnected curvilinear members. The body 116 has a generally tubular cross-section with inner walls that define a cavity therebetween. The cavity is open at the first end 118 and the second end 120. In addition, the body 116 includes a circumferential opening or slit defined by a first circumferential edge 122 and an oppositely disposed second circumferential edge 124 which each extend from the first end 118 to the second end 120. In the embodiment of FIG. 2, the circumferential slit is located about an outer circumference of the body 116.

Figure 3:
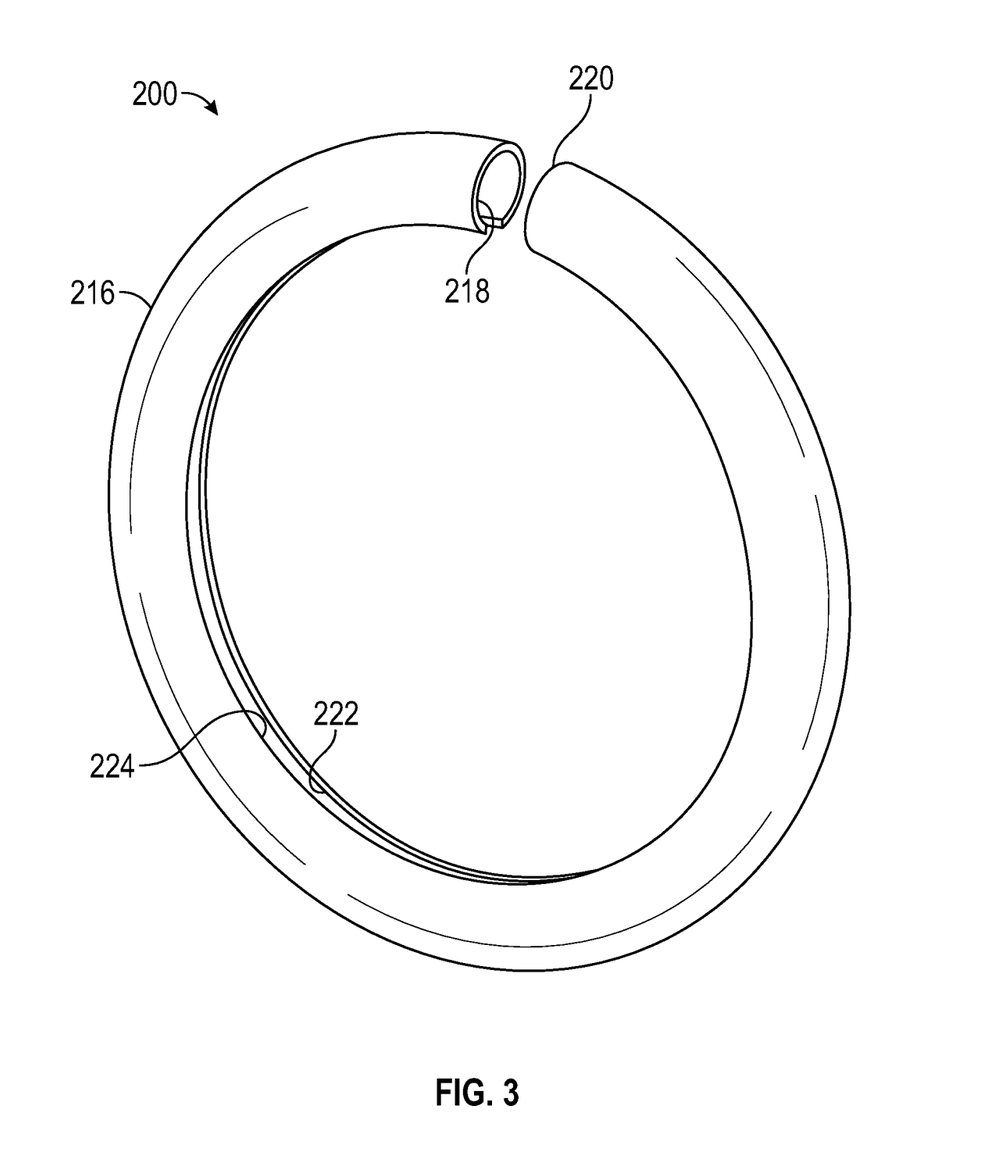
FIG. 3 schematically represents a perspective view of a snap ring in accordance with an embodiment.

FIG. 3 schematically represents a perspective view of a snap ring 200 in accordance with certain nonlimiting aspects of another embodiment. Similar to the snap ring 100 of FIG. 1, the snap ring 200 includes a substantially circular or annular body 216 having a gap defined between a first end 218 and a second end 220. The body 216 has a generally tubular cross-section with inner walls that define a cavity therebetween that is open at the first end 218 and the second end 220. In contrast to the embodiment of FIG. 1, the body 216 includes a circumferential opening or slit defined by a first circumferential edge 222 and an oppositely disposed second edge 224 that is located about an inner circumference of the body 216. For convenience, various aspects of embodiments will be described hereinafter in reference to the snap ring 100; however, it should be understood that the aspects described are, in general, equally applicable to the snap ring 200.

The snap ring 100 may be used in various mechanical systems to maintain positions of other components (i.e., retained components) within the systems. In various embodiments, the snap ring 100 may be configured to be coupled with a shaft having a circular cross-sectional shape to maintain a retained component in a fixed position thereon. Specifically, the retained component may have a bore configured to receive the shaft therethrough. While the retained component is located on the shaft, the members of the snap ring 100 may be deflected or flexed to facilitate insertion into a continuous, circumferential mating groove formed in an exterior surface of the shaft that has a shape and size configured to receive and retain at least a portion of the snap ring 100. In some embodiments, the mating groove may have a substantially semi-circular cross-sectional shape with a diameter that is larger than an outer diameter of the snap ring 100. While within the mating groove, the snap ring 100 may function as a physical barrier against movement of the retained component along the shaft. As such, the shaft and the snap ring 100, in combination, may be configured to maintain the retained component in a fixed position.

In various embodiments, the shaft and the snap ring 100, in combination, are configured to maintain the retained component in the fixed position in a manner such that a first side of the retained component is in contact with a body fixed to the shaft and a second side of the component is in contact with the snap ring 100. In some embodiments, the body fixed to the shaft may be a surface integral with and protruding from the shaft. In some embodiments, the body fixed to the shaft may be another component separate from and secured to the shaft.

The construction of the snap ring 100 provide for elastic deformation both in a radial direction by decreasing a first dimension between the first end 118 and the second end 120, and in an axial direction by decreasing a second dimension between the first circumferential edge 122 and the second circumferential edge 124. These configurations, in combination with mating grooves having certain structures, provide for various benefits including, for example, the capability to be axially preloaded and self-locking.

In some embodiments, the snap ring 100 may be preloaded such that the snap ring 100 is pinned within the mating groove between a wall of the mating groove and the retained component while the retained component is fixed in position on the shaft by the snap ring 100. This may be accomplished by compressing the snap ring 100 in an axial direction thereof, inserting the snap ring 100 into the mating groove, and then releasing the compression on the snap ring 100 such that the snap ring 100 contacts the retained component prior to fully expanding to its original shape. With such arrangement, the snap ring 100 is configured to apply a biasing force against the retained component while the snap ring 100 is in the mating groove and the component is in the fixed position. As such, the snap ring 100 may be used in some embodiments without additional components, such as springs, to hold retained component(s) against the snap ring 100 while located within the mating groove.

In various embodiments, the snap ring 100 may be self-locking within the mating groove, that is, additional components such as fasteners, clips, and the like may not be necessary to maintain the snap ring 100 within the mating groove. In some embodiments, the self-locking capability may be, at least in part, due to the shape and size of the snap ring 100 and the mating groove, as well as a location of a point of contact between the snap ring 100 and the retained component. In some embodiments, the snap ring 100 is configured to be received within the mating groove to a depth in excess of one half of an outer diameter of the snap ring 100. As such, in these embodiments a first portion of the snap ring 100 within the mating groove is larger than a second portion of the snap ring 100 protruding from the mating groove. In some embodiments, the biasing force applied by the snap ring 100 on the retained component has a force vector that is aligned with a geometric line that intersects a wall of the mating groove. Stated another way, a first dimension between a point of contact between the snap ring 100 and the retained component and the opposite edge of the mating groove is smaller than a cross-sectional diameter of the snap ring 100. As such, in these embodiments, the snap ring 100 is being forced into the mating groove rather than out of the mating groove.

In various embodiments, the snap ring 100 is configured to maintain the retained component in the fixed position while maintaining a gap between the first circumferential edge 122 and the second circumferential edge 124. That is, the first circumferential edge 122 and the second circumferential edge 124 are not in contact with each other while the snap ring 100 pinned in the mating groove. In such embodiments, an amount of compression that the snap ring 100 may be under while in the mating groove may be related to the size of the circumferential slit between the first circumferential edge 122 and the second circumferential edge 124.

The snap ring 100 may have spring constants in the radial and axial directions based on the thickness of the body 116, the properties of the material from which the body 116 are formed, the diameter of the body 116, and the like. The biasing force applied by the snap ring 100 on the retained component(s) may correspond to the spring constant of the snap ring 100 in the axial direction.

The snap ring 100 may be formed of various materials. In some embodiments, the snap ring 100 is formed of a metallic material. In some embodiments, the snap ring 100 includes a stainless steel.

FIGS. 4-7 illustrate a nonlimiting example application of the snap ring 100. It should be noted that this example is merely for illustrative purposes and the snap ring 100, the shaft, and the retained component(s) may have other configurations.

Figure 4:
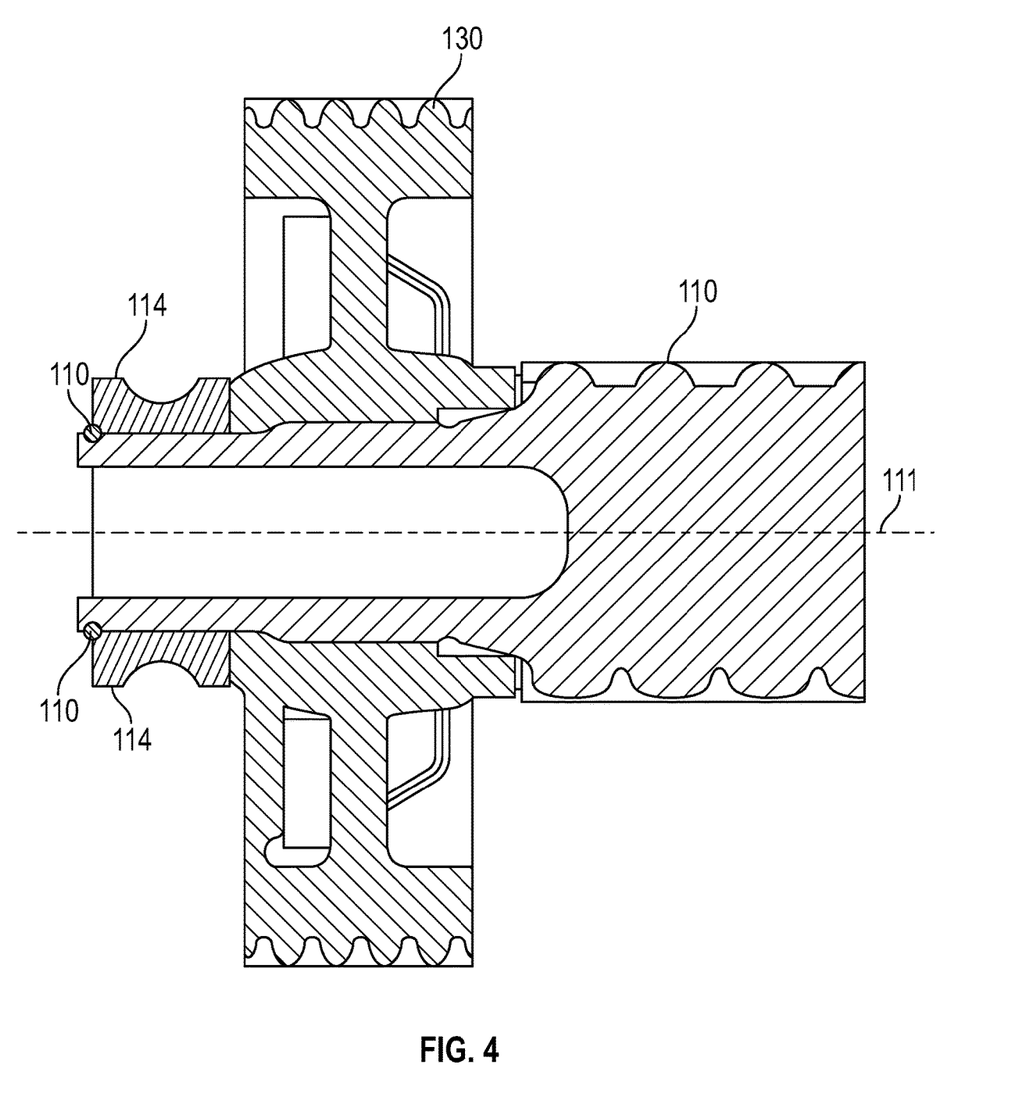
FIG. 4 schematically represents a cross-sectional view of a rotatable shaft having a gear and an inner bearing race retained thereon with the snap ring of FIG. 1 in accordance with an embodiment.

FIG. 4 schematically represents a cross-sectional view of a rotatable shaft 110, a gear 130, and an inner bearing race 114. In this example, both the gear 130 and the inner bearing race 114 may be considered to be retained components. The gear 130 and the inner bearing race 114 have substantially circular profiles and include central bores which have an end of the shaft 110 received therethrough. The gear 130 is fixed in a longitudinal position on the shaft 110 between protruding surfaces or features of the shaft 110 on a first side of the gear 130 and the inner bearing race 114 on a second side of the gear 130. The inner bearing race 114 is fixed in a longitudinal position on the shaft 110 between the gear 130 on a first side of the inner bearing race 114 and the snap ring 100 on a second side of the inner bearing race 114.

Figure 5:
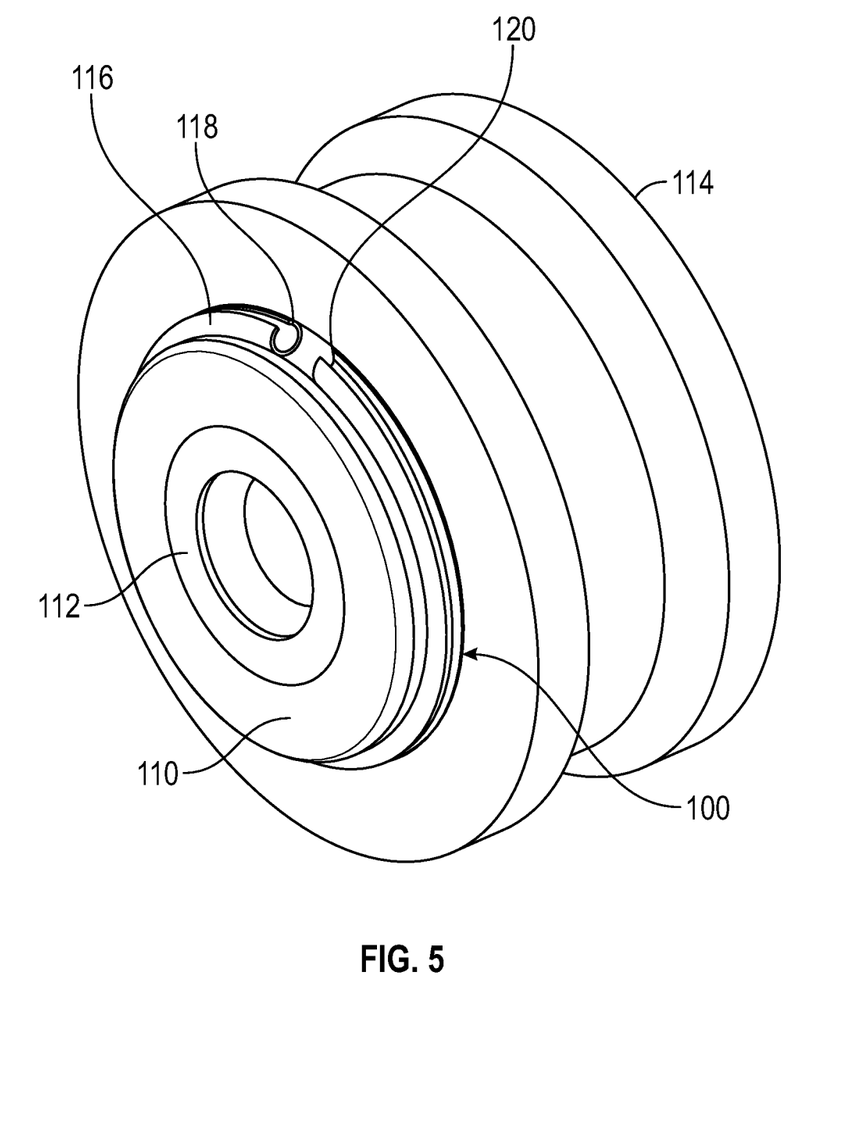
FIG. 5 schematically represents an isolated, perspective view of the end of the shaft of FIG. 1 having the snap ring and the inner bearing race thereon.
Figure 6:
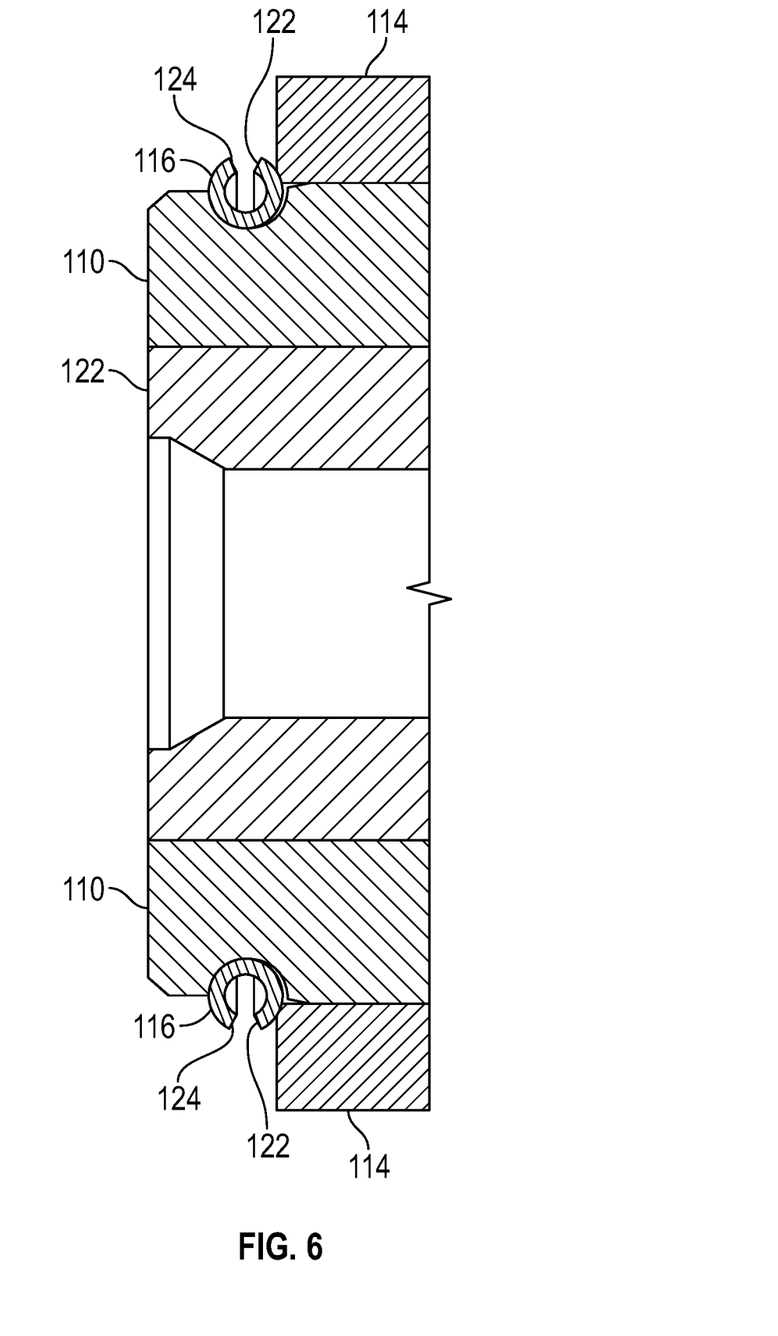
FIG. 6 schematically represents an isolated, cross-sectional view of the end of the shaft of FIG. 5.
Figure 7:
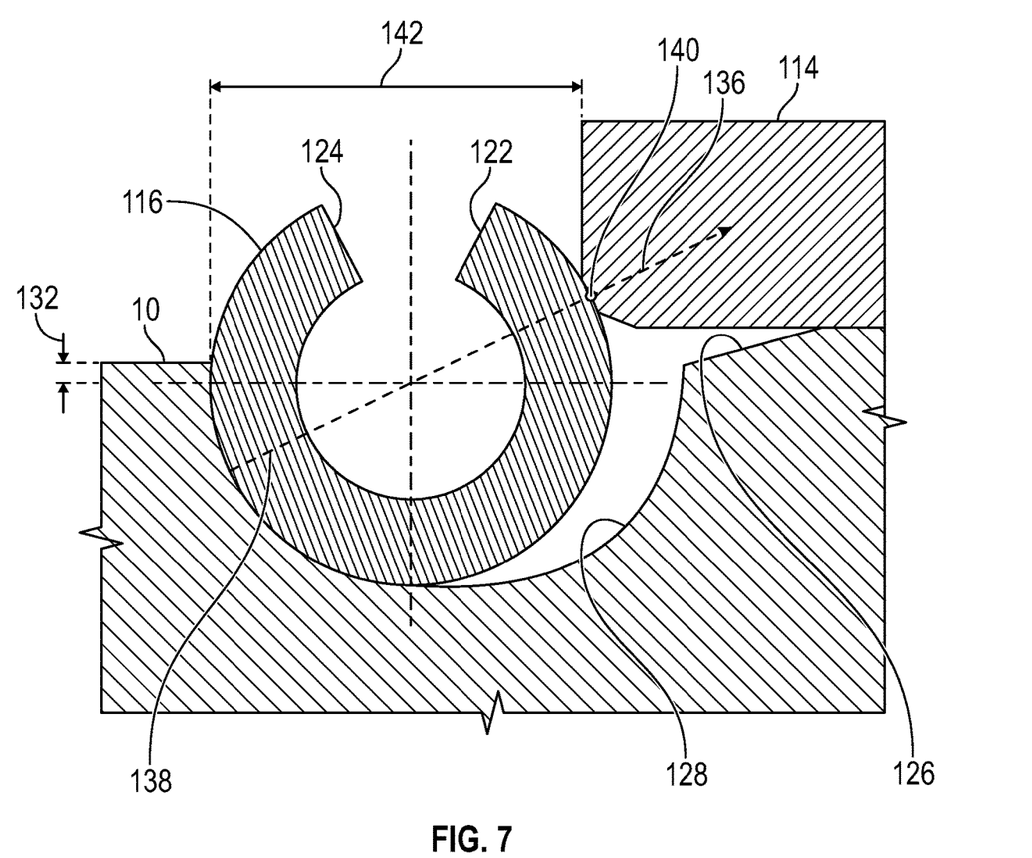
FIG. 7 schematically represents an enlarged, cross-sectional view of a portion of the snap ring of FIG. 1 and adjacent portions of the shaft and the inner bearing race of FIG. 1.

FIG. 5 schematically represents an isolated, perspective view of the end of the shaft 110 including the snap ring 100 and the inner bearing race 114. The gear 130 and the remainder of the shaft 110 have been omitted for clarity. FIG. 6 schematically represents an isolated, cross-sectional view of the end of the shaft, the snap ring 100, and a portion of the inner bearing race 114. FIG. 7 schematically represents an enlarged, cross-sectional view of a portion of the snap ring 100 and adjacent portions of the shaft 110 and the inner bearing race 114.

Referring to FIG. 7, the snap ring 100 is pinned within the mating groove between a wall 128 of the mating groove and the inner bearing race 114 and under compression (i.e., preloaded). The snap ring 100 is located within the mating groove to a depth in excess of one half of an outer diameter of the snap ring 100, as represented by the dimension 132 between a centerline of the snap ring 100 and an exterior surface of the shaft 110 adjacent to the mating groove. The snap ring 100 is applying a biasing force against the inner bearing race 114. In this example, the snap ring 100 and the inner bearing race 114 are in physical contact at a surface or a point of contact 140. The biasing force applied to the inner bearing race 114 by the snap ring 100 is represented by a force vector 136. The force vector 136 is aligned with a geometric line 138 that intersects the wall 128 of the mating groove. Stated another way, a first dimension 142 between the point of contact 140 between the snap ring 100 and the inner bearing race 114 and the opposite edge of the mating groove is smaller than a cross-sectional diameter of the snap ring 100. As such, the snap ring 100 is being forced into the mating groove rather than out of the mating groove (i.e., self-locking).

In various embodiments, the shaft 110 may include a sloped surface 126 that increases the shaft from a first diameter to a second diameter that is larger than the first diameter. This sloped surface 126 may promote ease of sliding the retained component(s), such as the inner bearing race 114 and the gear 130, past the mating groove of the shaft 110.

Figure 8:
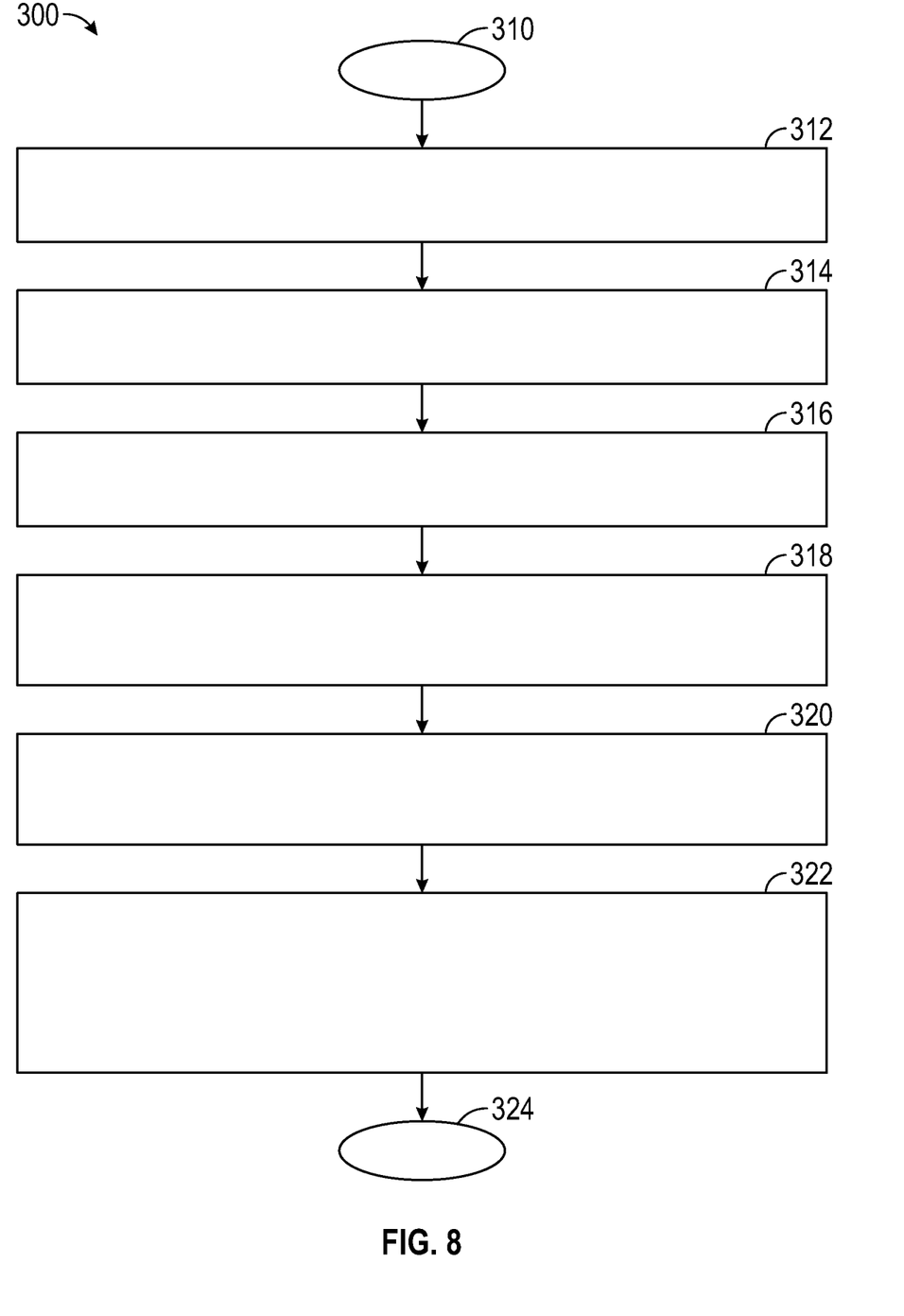
FIG. 8 is a method for retaining a component on a shaft with a snap ring in accordance with an embodiment.

With reference now to FIG. 8 and with continued reference to FIGS. 1-7, a flowchart provides a method 300 for retaining a component on a shaft as performed with a snap ring (e.g., the snap ring 100), in accordance with exemplary embodiments. As can be appreciated in light of the disclosure, the order of operation within the method 300 is not limited to the sequential execution as illustrated in FIG. 8, but may be performed in one or more varying orders as applicable and in accordance with the present disclosure.

In one example, the method 300 may start at 310. At 312, the method 300 may include locating an end of a shaft though a bore of a component such that the component is received on the shaft. At 314, the method 300 may include sliding the component along the shaft to contact a first side of the component with a body fixed to the shaft. At 316, the method 300 may include providing a snap ring comprising an annular body defining an opening through a center thereof, the annular body defining an outer curved surface and an inner curved surface, the annular body having a first end and a second end spaced apart from each other to define a gap therebetween, a first circumferential edge and a second circumferential edge spaced apart from each other to define a circumferential opening or slit extending from the first end to the second end. At 318, the method 300 may include applying a compressive force to the snap ring in an axial direction thereof to decrease a dimension between the first circumferential edge and the second circumferential edge. At 320, the method 300 may include inserting the snap ring into a mating groove of the shaft adjacent to a second side of the component while maintaining the compressive force on the snap ring. At 322, the method 300 may include releasing the compressive force from the snap ring such that the dimension between the first circumferential edge and the second circumferential edge increases causing contact between the snap ring and the second side of the component while the snap ring remains within the mating groove. The snap ring is pinned within the mating groove between a wall of the mating groove and the second side of the component. The snap ring applies a biasing force against the second side of the component. The method 300 may end at 324.

In some embodiments, the shaft, the retained component(s), and the snap ring 100 are parts of an assembly. In some embodiments, the shaft, the retained component(s), and the snap ring 100 are configured to be installed as components of a vehicle. In various embodiments, the vehicle may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle may also comprise a motorcycle and/or one or more other types of vehicles. In addition, in various embodiments, it will also be appreciated that the vehicle may comprise any number of other types of mobile platforms.

In various embodiments, the snap ring 100 may be used in mechanical systems of devices that are not associated with vehicles. In various embodiments, the snap ring 100 may be used in various machinery, motors, or other devices. In various embodiments, the snap ring 100 may be used in a wet clutch, a one-way clutch, or another types of clutch. In various embodiments, the snap ring 100 may be used as a substitute for various other types of tapered snap rings.

Figure 9:
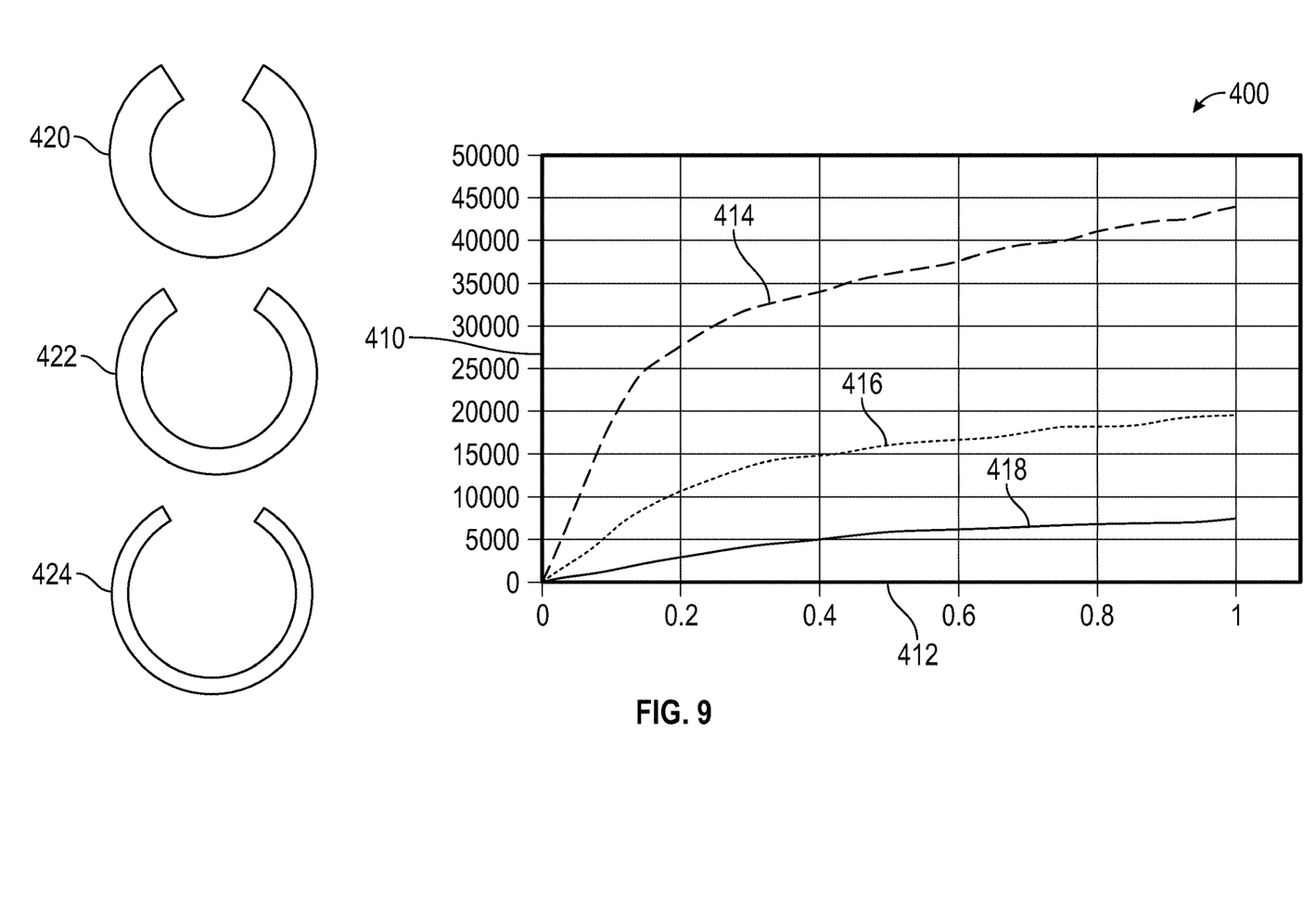
FIG. 9 is a plot of data obtained from application of compressive forces in axial directions of snap rings having varying cross-sectional thicknesses.
Figure 10:
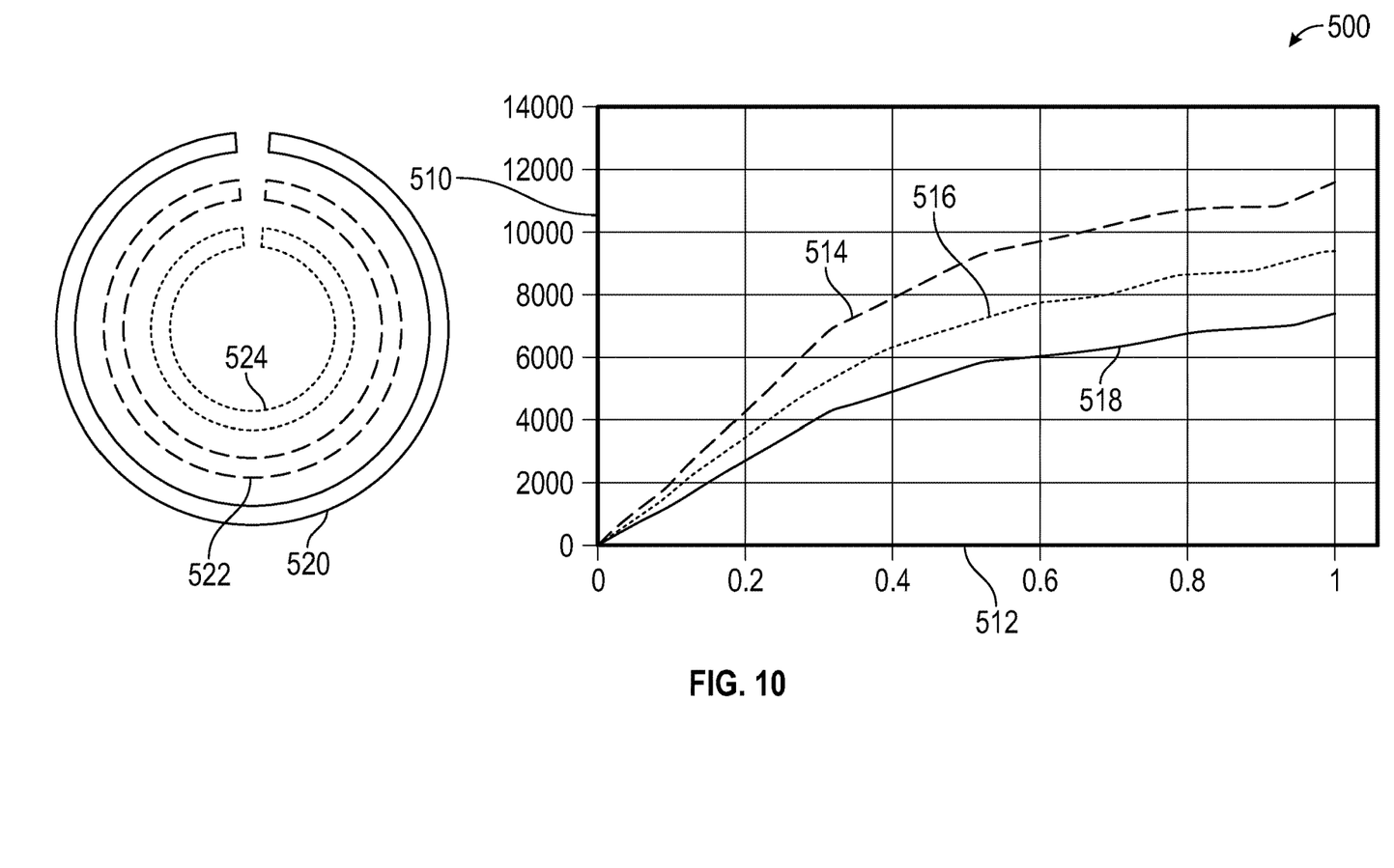
FIG. 10 is a plot of data obtained from application of compressive forces in axial directions of snap rings having varying diameters.
Figure 11:
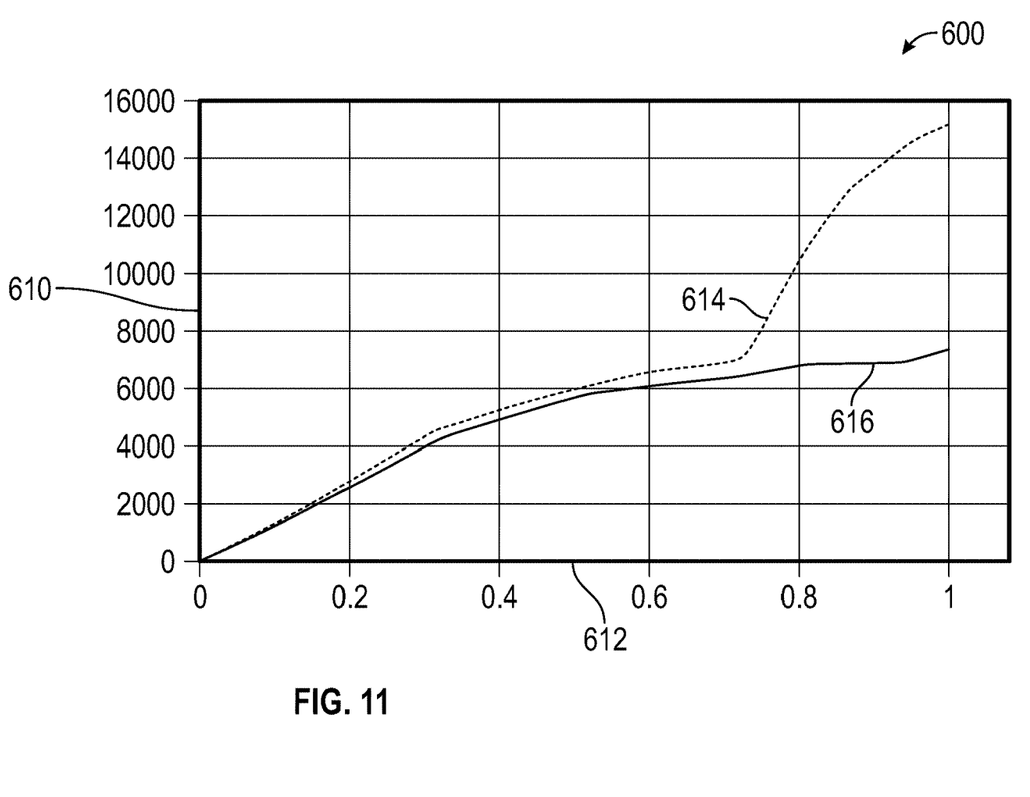
FIG. 11 is a plot of data obtained from application of compressive forces in axial directions of snap rings with and without contact between ends of the snap rings.

FIGS. 9-11 represent data obtained during experimental investigations leading to the present invention. These data are presented herein to illustrate certain aspects of various embodiments, but are not necessarily intended to limit the embodiments disclosed herein.

FIG. 9 is a plot 400 of data obtained from application of compressive forces in axial directions of sample snap rings 420, 422, and 424 having varying cross-sectional thicknesses (i.e., measured between the inner and outer curved surfaces thereof). For the plot 400, the y-axis represents compressive force applied to the snap rings in newtons (N) and the x-axis represents compression of the snap rings in millimeters (mm). The plot 400 shows a first data line 414 representing observed results from testing performed on the first sample snap ring 420 having a cross-sectional dimension of 1.00 mm, a second data line 416 representing observed results from testing performed on the second sample snap ring 422 having a cross-sectional dimension of 0.70 mm, and a third data line 418 representing observed results from testing performed on the third sample snap ring 424 having a cross-sectional dimension of 0.42 mm. As shown, the results indicated that the sample snap rings 420, 422, and 424 show increased resistance to compression with increased cross-sectional thickness. However, in general, the sample snap rings 420, 422, and 424 showed similar compression responses when adjusted for cross-sectional thickness.

FIG. 10 is a plot 500 of data obtained from application of compressive forces in axial directions of sample snap rings 520, 522, and 524 having varying diameters. For the plot 500, the y-axis represents compressive force applied to the snap rings in newtons (N) and the x-axis represents compression of the snap rings in millimeters (mm). The plot 500 shows a first data line 514 representing observed results from testing performed on the first sample snap ring 520 having a diameter of 75 mm, a second data line 516 representing observed results from testing performed on the second sample snap ring 522 having a diameter of 55 mm, and a third data line 518 representing observed results from testing performed on the third sample snap ring 524 having a diameter of 35 mm. As shown, the results indicated that the sample snap rings 520, 522, and 524 show increased resistance to compression with increased diameter. However, in general, the sample snap rings 520, 522, and 524 showed similar compression responses when adjusted for diameter.

FIG. 11 is a plot 600 of data obtained from application of compressive forces in axial directions of snap rings 620 and 622 with and without contact between ends of the snap rings, respectively. For the plot 600, the y-axis represents compressive force applied to the snap rings in newtons (N) and the x-axis represents compression of the snap rings in millimeters (mm). The plot 600 shows a first data line 614 representing observed results from testing performed on the first sample snap ring 620 that experienced contact between ends thereof at a compression of about 0.75 mm, and a second data line 616 representing observed results from testing performed on the second sample snap ring 622 that did not experience contact between ends thereof. As shown, the results indicated that the first sample snap ring 620 showed significantly increased resistance to compression upon contact of the ends thereof relative to the second sample snap ring 622. Therefore, the sample snap rings 620 and 622 showed significantly different compression responses in the later stages of compression (i.e., subsequent to contact for the snap ring 620). This in turn implies that the snap rings 100 and 200 disclosed herein may provide significantly different compression responses than those of solid snap rings known in the art. Furthermore, the snap rings 100 and 200 may be used for retention solutions that provide a first compression response up to a predetermined load, and then provide a second compression response beyond the predetermined load that is different than the first compression response. This may allow for minor, desirable deflection at lower loads and simultaneously allow for significant resistance to compression at higher loads.

The systems and methods disclosed herein provide various benefits over certain existing systems and methods. For example, the snap rings 100 and 200 may be used to secure retained components in fixed positions along a shaft without the need of additional components for maintaining a position of the snap rings 100 and 200 within the mating groove and/or maintain the position of the retained component against the snap rings 100 and 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An assembly comprising:
   a shaft having a circular cross-sectional shape;
   a component having a bore configured to receive the shaft therethrough; and
   a snap ring having an annular body defining an opening through a center thereof, the annular body defining an outer curved surface and an inner curved surface, the annular body having a first end and a second end spaced apart from each other to define a gap therebetween, a first circumferential edge and a second circumferential edge spaced apart from each other to define a circumferential slit extending from the first end to the second end,
   wherein the snap ring is configured to be received within a continuous, circumferential mating groove formed in an exterior surface of the shaft,
   wherein the shaft and the snap ring, in combination, are configured to retain the component in a fixed position when the component is located on the shaft and the snap ring is located in the mating groove.

2. The assembly of claim 1, wherein the snap ring is configured for elastic deformation in a radial direction thereof by decreasing a first dimension between the first end and the second end and elastic deformation in an axial direction by decreasing a second dimension between the first circumferential edge and the second circumferential edge.

3. The assembly of claim 1, wherein the snap ring is configured to be received within the mating groove to a depth in excess of one half of an outer diameter of the snap ring.

4. The assembly of claim 1, wherein the snap ring is configured to be pinned within the mating groove between a wall of the mating groove and the component while the component is in the fixed position, wherein the first circumferential edge and the second circumferential edge are not in contact with each other while the snap ring pinned in the mating groove.

5. The assembly of claim 1, wherein the shaft, the component, and the snap ring are configured to be installed as components of a vehicle.

6. The assembly of claim 1, wherein the snap ring is configured to be apply a biasing force against the component while the snap ring is in the mating groove and the component is in the fixed position.

7. The assembly of claim 6, wherein the biasing force has a force vector that is aligned with a geometric line that intersects a wall of the mating groove.

8. The assembly of claim 1, wherein the shaft and the snap ring, in combination, are configured to retain the component in the fixed position in a manner such that a first side of the component is in contact with a body fixed to the shaft and a second side of the component is in contact with the snap ring.

9. The assembly of claim 8, wherein the body fixed to the shaft is a surface integral with and protruding from the shaft.

10. The assembly of claim 8, wherein the body fixed to the shaft is another component separate from and secured to the shaft.

11. A method for retaining a component on a shaft, the method comprising:
    locating an end of the shaft though a bore of the component such that the component is received on the shaft;
    sliding the component along the shaft to contact a first side of the component with a body fixed to the shaft;
    providing a snap ring comprising an annular body defining an opening through a center thereof, the annular body defining an outer curved surface and an inner curved surface, the annular body having a first end and a second end spaced apart from each other to define a gap therebetween, a first circumferential edge and a second circumferential edge spaced apart from each other to define a circumferential slit extending from the first end to the second end;
    applying a compressive force to the snap ring in an axial direction thereof to decrease a dimension between the first circumferential edge and the second circumferential edge;
    inserting the snap ring into a mating groove of the shaft adjacent to a second side of the component while maintaining the compressive force on the snap ring; and
    releasing the compressive force from the snap ring such that the dimension between the first circumferential edge and the second circumferential edge increases causing contact between the snap ring and the second side of the component while the snap ring remains within the mating groove,
    wherein the snap ring is pinned within the mating groove between a wall of the mating groove and the second side of the component, wherein the snap ring applies a biasing force against the second side of the component.

12. The method of claim 11, wherein the body fixed to the shaft is a surface integral with and protruding from the shaft.

13. The method of claim 11, wherein the body fixed to the shaft is another component separate from and secured to the shaft.

14. The method of claim 11, wherein inserting the snap ring into the mating groove includes locating the snap ring within the mating groove to a depth in excess of one half of an outer diameter of the snap ring.

15. The method of claim 11, wherein the biasing force has a force vector that is aligned with a geometric line that intersects the wall of the mating groove.

16. The method of claim 11, wherein the first circumferential edge and the second circumferential edge are not in contact with each other while the snap ring pinned in the mating groove.

17. The method of claim 11, further comprising installing the shaft, the component, and the snap ring in a vehicle as components thereof.

\* \* \* \* \*